United States Patent [19]

Schneider et al.

[11] Patent Number: 4,845,234

[45] Date of Patent: Jul. 4, 1989

[54] SALTS OF 2-M-PROPYLIMIDAZOLE

[75] Inventors: Wolfgang Schneider, Kaiseraugst; Kurt Amsler, Basel, both of Switzerland

[73] Assignee: Ciba-Geigy Corporation, Ardsley, N.Y.

[21] Appl. No.: 176,579

[22] Filed: Apr. 1, 1988

Related U.S. Application Data

[60] Division of Ser. No. 881,512, Jun. 30, 1986, Pat. No. 4,762,585, which is a continuation of Ser. No. 667,508, Nov. 1, 1984, abandoned.

[30] Foreign Application Priority Data

Nov. 9, 1983 [CH] Switzerland ............... 6036/83
Feb. 27, 1984 [CH] Switzerland ............... 931/84

[51] Int. Cl.$^4$ ............................................. C07D 233/58
[52] U.S. Cl. ..................................... 548/335; 548/336
[58] Field of Search ........................................ 548/335

[56] References Cited

U.S. PATENT DOCUMENTS 3,943,146 3/1976 Sweeny et al. ................. 548/335 X Primary Examiner—Richard A. Schwartz
Attorney, Agent, or Firm—Luther A. R. Hall

[57] ABSTRACT

A process is described for lining the inner surfaces of pipes or pipe sections using the Insituform method by pressing a tubular flexible laminate made up of an essentially liquid-impermeable membrane and a fibrous layer which has been impregnated with a binder which is not as yet fully cured with the face with the binder against the inner surface of the pipe by means of liquid pressure in such a way that the laminate takes on the shape of the inner surface of the pipe and the binder becomes fully cured in this state, forming a firmly adhering internal lining. The binder used according to the invention in this process contains (a) a curing agent which is a salt of one or more (poly)amines having at least one tertiary nitrogen atom and one or more aromatic polyols or one or more aliphatically substituted phenols, the aliphatic radical having at least 9 carbon atoms, and
(b) a liquid epoxy resin or a liquid mixture of epoxy resins and can, if desired, also contain
(c) further additives.

The process according to the invention is suitable, for example, for lining the inner surfaces or sewers and of gas and water mains.

2 Claims, No Drawings

SALTS OF 2-M-PROPYLIMIDAZOLE

This is a divisional of application Ser. No. 881,512, filed on June 30, 1986, now U.S. Pat. No. 4,762,585, which is a continuation of application Ser. No. 667,508 filed on Nov. 1, 1984, now abandoned.

The present invention relates to a novel process for lining the inner surfaces of pipes or pipe sections by the so-called Insituform method using certain binders (mixtures of resin and curing agent) and to the products produced thereby.

It is known to use the Insituform method for lining or repairing pipes or pipe sections, in particular man-sized or narrower underground pipes and mains, such as sewers, gas and water mains or oil pipelines. This method comprises using a feed or inversion pipe to introduce into the main which is to be lined or restored a tubular flexible laminate made up of an essentially liquid-impermeable membrane made of, for example, polyvinyl chloride, polyethylene, polyester or polyurethane, and a fibrous layer which has been impregnated with a binder which is not as yet fully cured. As the tube is introduced the layer of the tube which is impregnated with the binder or resin faces towards the centre of the tube at first. After one end of the tube has been attached to the end of the pipe which is to be lined, water is pumped under pressure into the inversion pipe, and the tube inverts and is pressed with the side impregnated with the resin against the inner surface of the pipe. The resin is generally cured to completion by pumping hot water into the inversion pump.

Hitherto the resins used with this method have been in the main unsaturated polyester resins. These polyester resins have the disadvantage that on curing they undergo relatively marked shrinkage and have insufficient bond strength to the substrate and a limited shelf-life at temperatures above 25° C. Moreover, unsaturated polyesters generally contain considerable proportions of styrene and have to be cured by means of peroxides [cf. for example the Synolite® brochure 593-61 0050 from the manufacturing company SYNRES]. Styrene has an unpleasant odour and, inter alia, a low flash point (31°-32° C.) and a high evaporation number. Furthermore, its high vapour pressure makes it unsafe from the point of view of industrial hygiene.

Unsaturated polyester resins are unsuitable, for example, for relining gas mains, since gas residues, such as tar, impair the curing of the resins. Nor, owing to the unpleasant odour and taste of styrene which cling to them, can they by used for lining water mains. Furthermore, they are advantageously not used for mains in the groundwater belt, since, owing to the poor adhesion of the resin, groundwater can penetrate between the inner surface of the pipe and the lining. The pressure of the groundwater then frequently causes large bubbles in the coating, thereby, impeding, inter alia, the free flow of the medium to be transported.

Epoxy resin/curing agent systems have actually been used before in the Insituform process. These systems, in which aromatic or aliphatic polyamines acted as the curing agent, are distinguished from polyester resins by improved adhesive strength, lower shrinkage and superior mechanical properties, such as increased tensile shear strength. However, they leave a great deal to be desired as regards shelflife, curing temperatures and/or viscosity [cf. for example British Pat. Nos. 1,340,063 and 1,449,455; Gas-Wasser-Abwasser, 61, 45-48 (1981); and "Polyester for relining underground pipes" in Australian Plastics and Rubber, October 1980].

The invention accordingly provides a process for lining the inner surfaces of pipes or pipe sections using the Insituform method by pressing a tubular flexible laminate made up of an essentially liquid-impermeable membrane and a fibrous layer which has been impregnated with a binder (resin mixture) which is not as yet fully cured with the face with the binder against the inner surface of the pipe by means of liquid pressure in such a way that the laminate takes on the shape of the inner surface of the pipe and the binder becomes fully cured in this state, forming a firmly adhering internal lining, wherein the laminate used has been impregnated with a binder which contains (a) a curing agent which is a salt of one or more (poly)amines having at least one tertiary nitrogen atom and one or more aromatic polyols or one or more aliphatically substituted phenols, the aliphatic radical having at least 9 carbon atoms, and (b) a liquid epoxy resin or a liquid mixture of epoxy resins and can, if desired, also contain (c) further additives.

Said salts (a) can be prepared from any aliphatic, araliphatic, aromatic or heterocyclic (poly)amine having at least one tertiary nitrogen atom. Amines of this type can also be substituted on carbon atoms, for example by halogen atoms, such as chlorine or bromine atoms, OH or CN groups, phenyl groups, $C_{5-8}$-cycloalkyl groups, alkyl or alkoxy groups each having 1-4 carbon atoms or aminoalkyl groups having 1-12 and in particular 1-4 carbon atoms.

Examples of suitable amines of at least partly aliphatic character are those of the formulae I-V

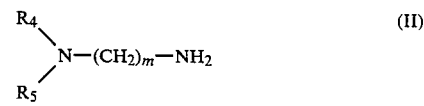

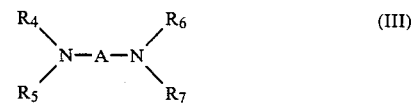

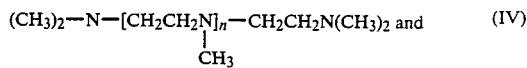

in which m is 2-6, in particular 2 or 3, n is zero, 1 or 2, $R_1$ is $C_{1-12}$-alkyl, in particular alkyl having 1-8 and especially 1-4 carbon atoms, hydroxyalkyl having 1-4 carbon atoms or alkoxyalkyl having a total of 2-6 carbon atoms, $R_2$ and $R_3$, independently of the other, are each the same as $R_1$ or are each unsubstituted or substituted phenyl, benzyl, phenylethyl, cyclopentyl or cyclohexyl, $R_4$ is $C_{1-4}$-alkyl, in particular ethyl and especially methyl, $R_5$ is $C_{1-4}$-alkyl, in particular ethyl and especially methyl, cyclopentyl or cyclohexyl, $R_6$ is $C_{1-12}$-alkyl, in particular alkyl having 1-8 and especially 1-4 carbon atoms, phenyl, benzyl, phenylethyl, benzoyl, cyclopentyl, cyclohexyl, $-A_1CN$ or $-A_1CH_2NH_2$, $R_7$ is hydrogen or $-A_1CH_2NH_2$ or $R_6$ and $R_7$ together are $-(CH_2)_p-$ with p=4 or 5, $-(CH_2)_2O(CH_2)_2-$ or $-(CH_2)_2NH(CH_2)_2-$, $R_8$ is $-OR_9$,

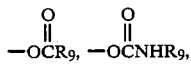

$-O-A_1CN$, $-O-A_1NH_2$,

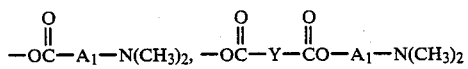

or $-O-Y_1-O-A_1-N(CH_3)_2$, $R_9$ is $C_{1-12}$-alkyl, especially $C_{1-4}$-alkyl, phenyl, benzyl, cyclopentyl or cyclohexyl, A and $A_1$, independently of the other, are each ethylene or 1,2- or 1,3-propylene, Y is a direct bond, $-C_rH_{2r}-$ with r=2-10, in particular 2-6, phenylene, toluylene or cyclohexylene and $Y_1$ is $-C_rH_{2r}-$ with r=2-10, in particular 2-6, phenylene, toluylene or cyclohexylene.

Also suitable are tertiary aminophenols of the formula VI

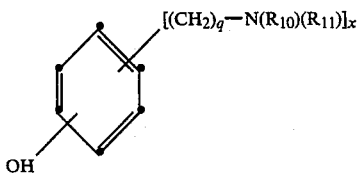

in which q is 1 or 2, x is 1, 2 or 3, and $R_{10}$ and $R_{11}$ independently of the other, each are $C_{1-4}$-alkyl, in particular methyl or ethyl. Examples of compounds of the formula VI are dimethylaminomethylphenol, diethylaminomethylphenol, bis(dimethylaminomethyl)-phenols, bis(diethylaminomethyl)phenols, bis(diethylaminoethyl)phenols and especially 2,4,6-tris(dimethylaminomethyl)phenol.

Heterocyclic tertiary amines can be saturated or unsaturated and can be unsubstituted or substituted, for example by halogen atoms or alkyl, phenyl or benzyl groups. Suitable are for example unsubstituted or substituted pyrazoles and imidazoles and N-substituted pyrroles, pyridines, pyrazines, indoles, piperidines and piperazines. Possible N substituents are in particular alkyl groups having 1-4 carbon atoms or phenyl or benzyl groups. Examples of heterocyclic structures of this type are N-methylpyrrole, pyrazole, N,N'-dimethylpyrazine and N,N'-diethylpyrazine, N-methylindole, N-ethylindole, N-methylpyridine, N-ethylpyridine, N-benzylpyridine, N-methylpiperidine, N-ethylpiperidine, N-isopropylpiperidine, N,N'-dimethylpiperazine and N,N'-diethylpiperazine. The heterocyclic tertiary amines are preferably imidazoles of the formula VII

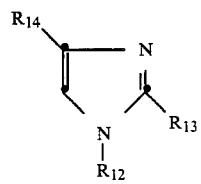

in which $R_{12}$ is hydrogen, $C_{1-4}$-alkyl, phenyl or benzyl, and $R_{13}$ and $R_{14}$, independently of the other, are each hydrogen, a halogen atom, such as chlorine or bromine, $C_{1-4}$-alkyl, phenyl, cyclohexyl or benzyl. Examples are imidazole, 2-chloroimidazole, 2-methylimidazole, 2-ethylimidazole, 2-n-propylimidazole, 2-phenylimidazole, 4-methylimidazole, 4-n-propylimidazole, 2-methyl-4-phenylimidazole, 2-cyclohexyl-4-methylimidazole and 2-ethyl-4-methylimidazole. Preference is given to imidazoles of the formula VII in which $R_{12}$ and $R_{14}$ are each hydrogen and $R_{13}$ is $C_{1-4}$-alkyl, in particular methyl, ethyl or n-propyl, or phenyl or in which $R_{12}$ and $R_{13}$ are each hydrogen and $R_{14}$ is hydrogen or $C_{1-4}$-alkyl, in particular methyl, ethyl or n-propyl.

The imidazoles of the formula VII in which $R_{12}$ is hydrogen can also be used in the form of adducts with polyglycidyl ethers. This is particularly advantageous in the case of unsubstituted imidazole. This preliminary reaction is preferably carried out with diglycidyl ethers of aromatic polyols, in particular bisphenol A [2,2-bis(4-hydroxyphenyl)propane], hydrogenated bisphenol A [2,2-bis(4-hydroxycyclohexyl)propane] or bisphenol F [bis(4-hydroxyphenyl)methane].

Alkyl groups $R_1$ to $R_6$ and $R_9$ to $R_{14}$, hydroxyalkyl groups $R_1$ to $R_3$ and alkoxyalkyl groups $R_1$ to $R_3$ can be straight-chain or branched. Examples are methyl, ethyl, n-propyl, isopropyl, n-butyl, sec.-butyl, n-pentyl, 2-pentyl, n-hexyl, n-heptyl, n-octyl, n-decyl and n-dodecyl, hydroxymethyl, 2-hydroxyethyl, 2-hydroxypropyl and 3-hydroxypropyl, and methoxymethyl, ethoxymethyl, 2-methoxyethyl and 2-isopropoxyethyl, respectively.

$-C_rH_{2r}-$ groups Y or $Y_1$ can likewise be straight-chain or branched, but are preferably straight-chain and have 2-6 carbon atoms.

Substituted phenyl, benzyl, phenylethyl, cyclopentyl or cyclohexyl groups $R_2$ or $R_3$ are in particular substituted by chlorine or bromine atoms or methyl, ethyl, methoxy or ethoxy groups. However, said radicals are preferably unsubstituted. Phenylene, toluylene or cyclohexylene Y or $Y_1$ are in particular 1,3- or 1,4-phenylene, 1,4-toluylene or 1,4-cyclohexylene. A and $A_1$ are each preferably ethylene or in particular 1,3-propylene.

In preferred compounds of the formula I, $R_1$ and $R_2$, independently of the other, are each $C_{1-4}$-alkyl or $C_{2-4}$-hydroxyalkyl and $R_3$ is $C_{1-4}$-alkyl, $C_{2-4}$-hydroxyalkyl, unsubstituted phenyl, benzyl, cyclopentyl or cyclohexyl. In particularly preferred amines of the formula I, $R_1$ and $R_2$ are each $C_{1-4}$-alkyl and $R_3$ is unsubstituted phenyl and especially unsubstituted benzyl.

In preferred compounds of the formula II, m is 2 or 3, $R_4$ is methyl or ethyl, and $R_5$ is methyl, ethyl or cyclohexyl.

In compounds of the formula III, $R_4$ and $R_5$ are both preferably ethyl and in particular methyl. $R_7$ is preferably hydrogen, and $R_6$ is preferably methyl, ethyl, n-propyl, isopropyl, n-butyl, isobutyl, cyclopentyl, cyclohexyl, benzoyl, 2-cyanoethyl or 3-aminopropyl. Preference is also given to compounds of the formula III in which $R_6$ is 2-cyanoethyl or 3-aminopropyl and $R_7$ is 3-aminopropyl. Particular preference is given to compounds of the formula III in which A is ethylene and especially 1,3-propylene, $R_7$ is hydrogen, and $R_6$ is 2-cyanoethyl or 3-aminopropyl. Some examples of compounds of the formula III are N,N-dimethyl-N'-(2-cyanoethyl)ethylenediamine, N,N-dimethyl-N'-(3-aminopropyl)ethylenediamine, N,N-dimethyl=N',N'-di-(3-aminopropyl)ethylenediamine, N,N-dimethyl-N'-(2-cyanoethyl)-1,3-diaminopropane, N,N-dimethyl-N'-(3-aminopropyl)-1,3-diaminopropane, N,N-dimethyl-N',N'-(3-aminopropyl)-1,3-diaminopropane and N,N-diethyl-N'-(benzoyl)-1,3-diaminopropane.

In compounds of the formula IV n is preferably zero or 1.

In the formula V $R_8$ is in particular —$OR_9$,

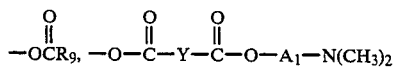

or —O—$Y_1$—O—$A_1$—N(CH$_3$)$_2$. In these groups, $R_9$ is preferably alkyl having 1-4 carbon atoms, phenyl or benzyl, Y is a direct bond, —(CH$_2$)$_r$— with r=2-6 or 1,3- or 1,4-phenylene, $Y_1$ is —(CH$_2$)$_r$— with r=2-6 or 1,3- or 1,4-phenylene and $A_1$ is ethylene and in particular 1,3-propylene. Examples of compounds of the formula V are β-dimethylaminoethyl β-cyamoethyl ether, γ-dimethylaminopropyl β-cyanopropyl ether, β-dimethylaminoethyl γ-aminopropyl ether, γ-dimethylaminopropyl γ-aminoisobutyl ether, β-dimethylaminoethyl acetate, β-dimethylaminopropyl acetate, β-dimethylaminopropyl 2-isobutyrate, γ-dimethylaminopropyl laurate, β-dimethylaminoethyl benzoate, β-dimethylaminoethyl N-phenylcarbamate, β-dimethylaminoethyl carbonate, β-dimethylaminoethyl γ-dimethylaminopropyl ether, 1,4-cyclohexyldi(γ-dimethylaminopropyl) ether, di(γ-dimethylaminoproply) terephthalate and di(β-dimethylaminoethyl) adipate.

Amines of the abovementioned type are known or can be prepared by methods which are known per se [cf. for example U.S. Pat. Nos. 4,201,854 and 4,324,739].

Particularly preferred amines are compounds of the formula I in which $R_1$ and $R_2$ are each ethyl and in particular methyl and $R_3$ is unsubstituted phenyl and in particular unsubstituted benzyl, especially benzyldimethylamine; amines of the formula II in which m is 2 or 3 and $R_4$ and $R_5$, independently of the other, are each methyl or ethyl, in particular those in which m is 3 and $R_4$ and $R_5$ are both methyl or ethyl; N,N-dimethyl-N'-(3-aminopropyl)-1,3-diaminopropane, N,N-dimethyl-N'-(2-cyanoethyl)-1,3-diaminopropane and in particular N,N-diethyl-N'-(benzoyl)-1,3-diaminopropane or mixtures thereof; compounds of the formula VI in which q is 1 and $R_{10}$ and $R_{11}$ are both ethyl and in particular methyl, x being as defined above; imidazoles of the formula VII in which $R_{12}$ and $R_{14}$ are each hydrogen and $R_{13}$ is hydrogen or $C_{1-4}$-alkyl; and adducts of said preferred imidazoles, in particular of unsubstituted imidazole, and diglycidyl ethers of bisphenol F, hydrogenated bisphenol A or bisphenol A.

Examples of suitable aromatic polyols for preparing salts (a) are resorcinol, hydroquinone, bis(4-hydroxyphenyl)methane (bisphenol F), 2,2-bis(4-hydroxyphenyl)propane (bisphenol A), 2,2-bis(4-hydroxy-3,5-dibromophenyl)propane (tetrebromobisphenol A), 1,1,2,2-tetrakis(4-hydroxyphenyl)ethane, 4,4'-dihydroxybiphenyl, bis(4-hydroxyphenyl) sulfone and novolcas of formaldehyde or acetaldehyde and phenol, chlorophenol or alkylphenols having up to 9 carbon atoms in the alkyl, in particular cresol novolacs and phenol novolacs. It is preferable to use salts of phenol novolacs and in particular of resorcinol, bisphenol F or bisphenol A and the abovementioned preferred amines. Very particular preference is given to salts of resorcinol, bisphenol F or bisphenol A and tris(dimethylaminomethyl)phenol, dimethylaminomethylphenol, 2-n-propylimidazole, N,N-dimethylaminopropylamine, N,N-diethylaminopropylamine or N,N-diethyl-N'-(benzoyl)-1,3-diaminopropane and salts of resorcinol, bisphenol F or bisphenol A and an adduct of imidazole and a diglycidyl ether of bisphenol A or bisphenol F.

Particularly suitable aliphatically substituted phenols are alkylphenols, alkenylphenols, alkadienylphenols and alkatrienylphenols having 9–18 and in particular 9–16 carbon atoms in the alkyl, alkenyl, alkadienyl and alkatrienyl groups. These aliphatic groups can be straight-chain or branched, but are preferably straight-chain. Examples of aliphatically substituted phenols are 3- and 4-n-nonylphenol, 3-n-decylphenol, 4-n-dodecylphenol, 4-n-tetradecylphenol, 4-n-pentadecylphenol, 4-n-octadecylphenol, 4-(2-nonenyl)phenol, 3-(4-decenyl)phenol, 4-(2-dodecenyl)phenol, 3-(9-octadecenyl)phenol, 4-(1,3-decadienyl)phenol, 3-(9,13-octadecadienyl)phenol, 3-(n-pentadecatrienyl)phenols, such as 3-(2,4,6-pentadecatrienyl)phenol extracted from cashew nuts and known as "Phenol CNSL", and 4-(9,11,15-octadecatrienyl)phenol. Preference is given to 3- and 4-n-nonylphenol and to 3-(2,4,6-pentadecatrienyl)phenol, in particular their salts with 2-n-propylimidazole or tris(dimethylaminomethyl)phenol. However, in general salts (a) are preferably salts of the defined type of (poly)amine and aromatic polyol.

The invention also relates to those of the salts (a) specifically developed for carrying out the process according to the invention which are novel. Particular preference is given to salts of resorcinol and 2-n-propylimidazole, especially to the 2:1 salt of resorcinol and 2-n-propylimidazole.

Said salts (a) can be prepared in a manner known per se by reacting (poly)amines having at least one tertiary nitrogen atom and aromatic polyols or phenols of the type defined, and generally by raising the reaction temperature to between 80° and 150° and especially 100° and 130° C. The reactants are advantageously employed in such amounts that there are 1 to 2 OH equivalents per nitrogen equivalent. Salts (a) are liquid to highly viscous. Their viscosity can be regulated, if desired, with suitable diluents, especially high-boiling organic solvents. Examples of suitable solvents and diluents are benzyl alcohol, furfuryl alcohol, cyclopentanol, cyclohexanol, pine oil and cyclic ketones, such as cyclopentanone and cyclohexanone. The diluents are generally used in amounts of 20–80% by weight, preferably 20–50% by weight, based on salt (a). The preferred diluent is benzyl alcohol.

Instead of salts (a) it is also possible to use in the process according to the invention mixtures of aromatic diols, such as resorcinol and bisphenols, especially bisphenol A or bisphenol F, with salts of compounds of the formula VI and saturated or unsaturated, straight-chain or branched aliphatic monocarboxylic acids. Which of the compounds of the formula VI are preferred is subject to what was stated above. Suitable aliphatic monocarboxylic acids are in particular those having up to 18 carbon atoms and especially saturated or unsaturated aliphatic monocarboxylic acids having 6-18 carbon atoms. Examples of suitable monocarboxylic acids are: acetic acid, propionic acid, butyric acid, isobutyric acid, caproic acid, 2-ethylcaproic acid, capric acid, lauric acid, palmitic acid, stearic acid, oleic acid and the highly branched monocarboxylic acids known as "versatic acids". Preferred salts for these mixtures are dimethylaminomethylphenol 2-ethylhexoate or oleate and in particular tris(dimethylaminomethyl)phenol trisoleate and especially tris(dimethylaminomethyl)phenol tris-2-ethylhexoate. The viscosity of said mixtures can likewise be set if desired to the desired value by adding diluents, in particular those of the abovementioned type. The salts of compounds of the formula VI and saturated or unsaturated aliphatic monocarboxylic acids are known or can be prepared by methods known per se.

Suitable epoxy resins (b) are in particular epoxy resins having on average more than one group which is bonded to a hetero atom, for example to a sulfur and preferably an oxygen or nitrogen atom, and has the formula VIII

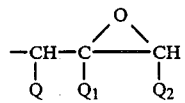
(VIII)

where Q and $Q_2$ are both a hydrogen atom and $Q_1$ is a hydrogen atom or a methyl group or Q and $Q_2$ together are —$CH_2CH_2$— or —$CH_2CH_2CH_2$— and $Q_1$ is a hydrogen atom.

Examples of resins of this type are polyglycidyl and poly($\beta$-methylglycidyl) esters which are derived from aliphatic, cycloaliphatic or aromatic polycarboxylic acids. Examples of suitable polycarboxylic acids are succinic acid, glutaric acid, adipic acid, pimelic acid, suberic acid, azelaic acid, sebacic acid, dimerised or trimerised linoleic acid, tetrahydrophthalic acid, 4-methyltetrahydrophthalic acid, hexahydrophthalic acid, 4-methylhexahydrophthalic acid, phthalic acid, isophthalic acid and terephthalic acid.

Further examples are polyglycidyl and poly($\beta$-methylglycidyl) ethers which are obtained by reacting a compound which contains at least two alcoholic and/or phenolic hydroxyl groups per molecule with epichlorohydrin or with allyl chloride and subsequently epoxidising with per-acids.

Examples of suitable polyols are ethylene glycol, diethylene glycol, poly(oxyethylene) glycols, propane-1,2-diol, poly(oxypropylene) glycols, propene-1,3-diol, butane-1,4-diol, poly(oxytetramethylene) glycols, pentane-1,5-diol, hexane-2,4,6-triol, glycerol, 1,1,1-trimethylolpropane, pentaerythritol, sorbitol, resorcinol, quinitol, bis(4-hydroxycyclohexyl)methane, 2,2-bis(4-hydroxycyclohexyl)propane, 1,1-bis(hydroxymethyl)-cyclohex-3-ene and also aromatic polyols of the type mentioned above in the preparation of salts (a).

Suitable poly(N-glycidyl) compounds are obtained by dehydrochlorinating products of reacting epichlorohydrin with amines having at least two amine-hydrogen atoms. Examples of suitable amines are aniline, n-butylamine, bis(4-aminophenyl)methane, 1,3- and 1,4-xylylenediamine, 1,3- and 1,4-bis(aminomethyl)cyclohexane and bis(4-methylaminophenyl)methane. Further suitable compounds of this type are triglycidyl isocyanurate, N,N'-diglycidyl derivatives of cyclic alkyleneureas, such as ethyleneurea and 1,3-propyleneurea, and hydantoins, such as 5,5-dimethylhydrantoin.

Examples of poly(S-glycidyl) compounds are the di-S-glycidyl derivatives of dithiols, such as ethanol-1,2-dithiol and bis(4-mercaptomethylphenyl) ether.

Examples of epoxy resins having one or more groups of the formula VIII in which Q and $Q_2$ together are a —$CH_2CH_2$— or —$CH_2CH_2CH_2$— group are bis(2,3-epoxycyclopentyl) ether, 2,3-epoxycyclopentyl glycidyl ether, 1,2-bis(2,3-epoxycyclopentyloxy)ethane, 3,4-epoxy-6-methylcyclohexylmethyl 3',4'-expoxy-6'-methylcyclohexanecarboxylate and 2-(3,4-epoxy)cyclohexyl-5,5-spiro(3',4'-epoxy)cyclohexane-m-dioxane.

It is also possible to use epoxy resins in which the epoxy groups are bonded to hetero atoms of various kinds of in which some or all of the epoxy groups are located in the centre of the molecule, such as the N,N,O-triglycidyl derivative of 4-aminophenol, N-glycidyl-N'-(2-glycidyloxypropyl)-5,5-dimethylhydantoin, vinylcyclohexene dioxide, limonene dioxide or dicyclopentadiene dioxide.

Said epoxy compounds can also be used in any mixtures with one another or with solid epoxy resins which are soluble in the epoxy resin mixture, the viscosity of the end mixture at room temperature being advantageously less than 15,000 mPa.s, preferably less than 8,000 mPa.s.

It is particularly preferable to use in the process according to the invention (so called) advanced or non-advanced diglycidyl ethers of dihydric phenols, especially of 2,2-bis(4-hydroxyphenyl)propane, 2,2-bis(3,5-dibromo-4-hydroxyphenyl)propane, bis(4-hydroxyphenyl)methane, bis(4-hydroxycyclohexyl)methane and 2,2-bis(4-hydroxycyclohexyl)propane, polyglycidyl ethers of novolacs or tetraglycidylated 4,4'-diaminodiphenylmethane. It is even more preferable to use (so-called) advanced or non-advanced diglycidyl ethers of bisphenol A, tetrabromo-bisphenol A or bisphenol F, tetraglycidylated 4,4'-diaminodiphenylmethane, polyglycidyl ethers of phenol-formaldehyde or cresol-formaldehyde novolacs, or mixtures thereof.

Said epoxy resins (b) can be mixed with a reactive diluent, for example phenyl or cresyl glycidyl ether, butanediol diglycidyl ether, diglycidyl hexahydrophthalate, neopentyl glycol diglycidyl ether or glycidyl esters of synthetic highly branched, mainly tertiary aliphatic monocarboxylic acids known as "CARDURA E", preferably in an amount of 3-50% by weight based on the total amount of epoxy resins. o-Cresyl glycidyl ether is the preferred reactive diluent.

The binders to be used according to the invention can also contain further additives known per se, in particular thixotropes and dyes.

Salts (a) or the mixtures described above which are used in their place are advantageously used in such an amount that there is 0.02 to 0.30, preferably 0.04 to 0.20 nitrogen equivalent per epoxy equivalent.

To ensure satisfactory impregnation of the laminate the viscosity of the binder at 25° C. should not exceed 6,000 mPa.s, preferably 3,000 mPa.s and in particular 1,000 mPa.s. If necessary the desired value is set after all the binder components have been mixed by adding suitable diluents.

The binders to be used according to the invention (resin mixtures) are distinguished by a long shelf-life (up to about 8 days at room temperature), so that it is possible to avoid premature curing of the resin during the preparation, any storage period and the transport of the laminates impregnated therewith to the site of use. Said binders can be cured at low temperatures, generally at temperatures as low as 60° C., into coatings having good mechanical properties, such as good tensile and flexural strengths, and good resistance to chemicals. Furthermore, the linings or coatings obtained with the binders of the type defined feature low shrinkage and good adhesion to the substrate, i.e. the inner surfaces of the pipes, which are wet or at least moist in many cases owing to their intended use, their position or even the cleaning which preceded the relining. This is surprising, since mixtures of epoxy resins and commercially available salts of tertiary amines with organic acids generally do not give full curing in the presence of water or moisture and produce tacky coatings having inadequate mechanical properties.

The preparation of the laminates coated on one face with the binder of the type defined and lining of the pipes using the Insituform method can be carried out in a manner known per se. Suitable procedures, membrane materials and fibrous materials are described, for example, in British Pat. Nos. 1,340,068 and 1,569,675, German Offenlegungsschriften Nos. 2,240,153 and 2,362,784 and the "Insituform News Digest" issued by the firm of Insituform (Pipes & Structures) Ltd., Great Britain. The relevant part of these publications is incorporated herein by reference. The membrane preferably consists of polyvinyl chloride sheeting, and the fibrous material is preferably polyester needle-punched felt.

The following Examples illustrate the invention.

A. Preparation of curing agents

EXAMPLE 1

265 g (1 mol) of tris(dimethylaminomethyl)phenol and 330 g (3 mol) of resorcinol are introduced into a 1.5 liter sulfonation flask which is equipped with a stirrer, a reflux condenser and a thermometer, and the mixture is heated with stirring in a nitrogen atmosphere to 110°–120° C. At around 100° C. the phenolic component dissolves in the amine. A mild exothermic reaction takes place. The temperature of the reaction mixture is held at 110°–120° C. for 60 minutes. It is then diluted with 450 g of benzyl alcohol. This produces a pale brown solution having a viscosity at 5,600 mPa.s at 25° C., an OH equivalent:nitrogen equivalent ratio [eq. OH:eq. N] of 2:1, and a solids content of 57% by weight (curing agent No. 1).

EXAMPLE 2

68 g (1 mol) of imidazole and 272 g of benzyl alcohol are introduced at room temperature (20°–25° C.) into a 750 ml sulfonation flask which is equipped with a stirrer, a dropping funnel, a reflux condenser and a thermometer. The mixture is heated under a blanket of nitrogen to 100°–110° C., and the imidazole dissolves to form a clear solution. 60 g of a technical bisphenol A diglycidyl ether (viscosity 10,000 mPa.s at 25° C., 5.35 epoxy equivalents/kg) are added dropwise at such a rate that 120° C. is not exceeded. 200 g of a phenol novolac (OH equivalent weight=105; 3.6 phenolic OH groups per mol) are then added, and the temperature is held at 110°–120° C. for about 60 minutes. The resulting product has a viscosity of 1,900 mPa.s at 25° C. an eq. OH:eq. N of 1:1, and a solids content of 55% by weight (curing agent No. 2).

EXAMPLE 3

100 g of bisphenol A [2,2-bis)4-hydroxyphenyl)propane] and 70 g of benzyl alcohol are introduced into a sulfonation flask of the type described in Example 1. The mixture is stirred under a blanket of nitrogen and is heated up to 110°–120° C., and the bisphenol A dissolves to form a clear solution. 60 g of tris(dimethylaminomethyl)phenol tris-2-ethylhexoate are then added, and the temperature of about 110° C. is held for 30 minutes. The resulting curing agent (curing agent No. 3) has a viscosity of 7,200 mPa.s at 25° C. and a solids content of 69% by weight.

EXAMPLES 4–36

The salts (curing agents) given in Table 1 below, are prepared analogously to the procedures described in Examples 1 to 2. Reaction conditions which differ from those of said Example are likewise given in Table 1.

TABLE 1

| Example (curing agent) No. | Salt of (g) | Diluent (g) | eq. OH: eq. N | Viscosity at 25° C. (mPa.s) | Solids content (% by weight) |
|---|---|---|---|---|---|
| 4 | Bisphenol A/Dimethylaminomethyl-phenol (228/151) | Benzyl alcohol (120) | 2:1 | 12000 | 76 |
| 5 | Bisphenol A/Dimethylaminomethyl-phenol (228/302) | Benzyl alcohol (100) | 1:1 | 4700 | 84 |
| 6 | Bisphenol A/Benzyldimethylamine (228/135) | Benzyl alcohol (67) | 2:1 | 13000 | 84 |
| 7 | Bisphenol A/Benzyldimethylamine (228/270) | Benzyl alcohol (22) | 1:1 | 1200 | 96 |
| 8 | Resorcinol/Dimethylaminomethyl-phenol (110/151) | Benzyl alcohol (100) | 2:1 | 5300 | 72 |
| 9 | Resorcinol/Dimethylaminomethyl-phenol (110/ 302) | Benzyl alcohol (60) | 1:1 | 4100 | 85 |
| 10 | Resorcinol/benzyldimethylamine (110/135) | Benzyl alcohol (55) | 2:1 | 1400 | 82 |
| 11 | Resorcinol/Tris(dimethylamino-methyl)phenol (330/265) | Cyclohexanol (595) | 2:1 | 8300 | 50 |
| 12 | Resorcinol/Tris(dimethylamino-methyl)phenol (330/265) | Cyclohexanone (595) | 2:1 | 680 | 50 |
| 13 | Resorcinol/Tris(dimethylamino-methyl)phenol (330/265) | Furfuryl alcohol (595) | 2:1 | 1300 | 50 |
| 14 | Resorcinol/2-n-Propylimidazole (110/110) | Benzyl alcohol (70) | 1:1 | 550 | 75 |
| 15 | Resorcinol/2-n-Propylimidazole (220/110) | Benzyl alcohol (110) | 2:1 | 1400 | 75 |
| 16 | Resorcinol/N,N—Diethylamino- | Benzyl alcohol (80) | 1:1 | 2900 | 75 |

TABLE 1-continued

| Example (curing agent) No. | Salt of (g) | Diluent (g) | eq. OH: eq. N | Viscosity at 25° C. (mPa.s) | Solids content (% by weight) |
|---|---|---|---|---|---|
| | propylamine (110/130) | | | | |
| 17 | Resorcinol/N,N—Dimethylamino-propylamine (220/98) | Benzyl alcohol (166) | 2:1 | 9100 | 66 |
| 18 | Bisphenol A/N,N—Diethylamino-propylamine (228/130) | Benzyl alcohol (212) | 1:1 | 1000 | 63 |
| 19 | Bisphenol A/N,N—Diethylamino-propylamine (456/130) | Benzyl alcohol (384) | 2:1 | 2600 | 60 |
| 20 | Bisphenol A/N,N—Dimethylamino-propylamine (228/98) | Benzyl alcohol (214) | 1:1 | 800 | 60 |
| 21 | Bisphenol A/2-n-Propylimidazole (228/110) | Benzyl alcohol (222) | 1:1 | 360 | 60 |
| 22 | Novolac[1]/2-n-Propylimidazole (200/110) | Benzyl alcohol (200) | 1:1 | 1000 | 61 |
| 23 | Novolac[1]/2-n-Propylimidazole (400/110) | Benzyl alcohol (330) | 2:1 | 2400 | 61 |
| 24 | Novolac[1]/2-n-Propylimidazole (200/220) | Benzyl alcohol (180) | 1:2 | 1000 | 70 |
| 25 | Novolac[1]/Imidazole (400/68) | Benzyl alcohol (302) | 2:1 | 3100 | 61 |
| 26 | Novolac[1]/2-n-Propylimidazole/ Imidazole(400/110/68), Imidazole prereacted with 60 g of bisphenol A diglycidyl ether as in Example 2 | Benzyl alcohol (412) | 1:1 | 2500 | 61 |
| 27 | Resorcinol/Imidazole (110/68), Imidazole prereacted with 60 g of bisphenol A diglycidyl ether as in Example 2 | Benzyl alcohol (238) | 1:1 | 260 | 50 |
| 28 | Resorcinol/ 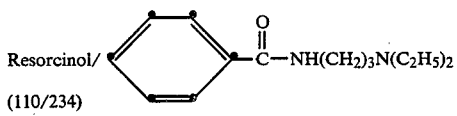 (110/234) | Benzyl alcohol (146) | 1:1 | 3200 | 70 |
| 29 | Resorcinol/ 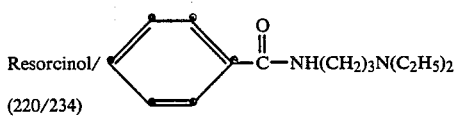 (220/234) | Benzyl alcohol (196) | 2:1 | 14500 | 70 |
| 30 | Resorcinol/ 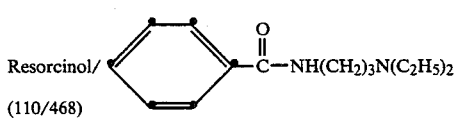 (110/468) | Benzyl alcohol (252) | 1:2 | 530 | 70 |
| 31 | Resorcinol/2-n-Propylimidazole | — | 2:1 | 82000 | 100 |
| 32 | 3-(2,4,6-Pentadecatrienyl)phenol [Phenol CNSL[2]]/Tris(dimethylamino-methyl)phenol (670/265) | — | 2:3 | 1200 | 100 |
| 33 | 3-(2,4,6-Pentadecatrienyl)phenol [Phenol CNSL[2]]/Tris(dimethylamino-methyl)phenol (1005/265) | — | 3:3 | 1000 | 100 |
| 34 | 4-n-Nonylphenol/Tris(dimethyl-aminomethyl)phenol (666:265) | — | 3:3 | 14700 | 100 |
| 35 | Phenol CNSL/2-n-Propylimidazole (335/110) | — | 1:2 | 200 | 100 |
| 36 | 4-n-Nonylphenol/2-n-Propyl-imidazole (444/110) | — | 2:2 | 1400 | 100 |

[1] Phenol novolac having an OH equivalent weight of 105; 3.6 phenolic OH groups per mol.
[2] Phenol extracted from cashew nuts 2:1 Salts of resorcinol and 2-n-propylimidazole can be prepared as follows:

(a) without added diluent (curing agent No. 31)

330 g (3 mol) of 2-n-propylimidazole are introduced into a 1.5 liter sulfonation flask which is equipped with a condenser, a stirrer, a thermometer and a widestemmed funnel. The compound is stirred under a blanket of nitrogen and is heated to about 100° C. by means of a heatable oil bath. 660 g (6 mol) of resorcinol are then added. There is a distinct exothermic reaction. After the esothermic reaction has died down the product is maintained at 120° C. for about one more hour. It is then cooled down. The salt obtained is a dark brown clear highly viscous liquid having an amine content of 3.2 equivalents/kg, a Höppler viscosity at 25° C. of 82,000 mPa.s, a density at 25° C. of 1.193 g/cm³, and a refractive index at 25° C. of 1.572.

(b) with added benzyl alcohol (curing agent No. 15)

440 g (4 mol) of resorcinol and 220 g of benzyl alcohol are introduced into a 1.5 liter sulfonation flask which is equipped with a condenser, a stirrer, a thermometer and a dropping cylinder. The mixture is heated with stirring in an inert gas atmosphere by means of a heatable oil bath to about 100°–120° C., and all of the resorcinol dissolves. 220 g (2 mol) of 2-n-propylimidazole are then added, and there is a market exothermic reaction. The 2-n-propylimidaole is added at such a rate that the temperature does not exceed 130° C. After the exothermic reaction has died down the product is held at 130° C. for about a further hour. It is then cooled down. The result is a clear brown solution of a 2:1 resorcinol/2-n-propylimidazole salt having an amine content of 2.4 equivalents/kg, a viscosity at 25° C. of 1,400 mPa.s, a density at 25° C. of 1.149 g/cm$^3$, and a refractive index at 25° C. of 1.5620.

EXAMPLE 37–45

The procedure described in Example 3 is used to prepare the curing agents given in Table 2, below. Reaction conditions which differ from those of Example 3 are likewise given in Table 2.

In each Example, four layers of a 3 mm thick felt (a 15×20 cm polyester needle-punched felt) are separately impregnated with the resin/curing agent mixture. The four layers of the impregnated felt are then pressed in a moulding press into 12 mm thick test specimens. The moulding press is subsequently placed into a basin which contains cold water and which is surrounded by a second basin, which is filled with an oil bath. The oil bath is heated to 70° C., which has the effect of raising the temperature of the water in the inner basin to 60° C. The water bath is held at 60° C. for 5 hours. The oil bath heating is then switched off and the oil bath is allowed to cool down overnight. The next morning the moulding press is taken out of the water and the test specimens are removed from the moulding press. The test specimens are measured for the following properties:

tensile strength (max) in accordance with ISO 3268 (*International Standards Organisation*) in N/mm$^2$, flexural strength (max) in accordance with ASTM D

TABLE 2

| Example (curing agent) No. | Curing agent of (g) | Diluent (g) | Viscosity 25° C. (mPa.s) | Solids content (% by weight) |
|---|---|---|---|---|
| 37 | Resorcinol/Tris(dimethylaminomethyl)phenol 2-ethylhexoate (50/100) | Benzyl alcohol (50) | 5800 | 75 |
| 38 | Resorcinol/Tris(dimethylaminomethyl)phenol 2-ethylhexoate (50/100) | Benzyl alcohol (100) | 620 | 60 |
| 39 | Resorcinol/Tris(dimethylaminomethyl)phenol 2-ethylhexoate (100/60) | Benzyl alcohol (90) | 1200 | 64 |
| 40 | Resorcinol/Tris(dimethylaminomethyl)phenol 2-ethylhexoate (100/80) | Benzyl alcohol (70) | 4700 | 72 |
| 41 | Bisphenol A/Tris(dimethylaminomethyl)phenol tris-2-ethylhexoate (100/60) | Benzyl alcohol (90) | 2400 | 64 |
| 42 | Bisphenol A/Tris(dimethylaminomethyl)phenol tris-2-ethylhexoate (150/80) | Benzyl alcohol (120) | 3600 | 66 |
| 43 | Bisphenol A/Tris(dimethylaminomethyl)phenol tris-2-ethylhexoate (50/60) | Benzyl alcohol (40) | 5600 | 73 |
| 44 | Bisphenol A/Tris(dimethylaminomethyl)phenol tris-2-ethylhexoate (150/60) | Benzyl alcohol (100) | 5500 | 67 |
| 45 | Bisphenol A/Tris(dimethylaminomethyl)phenol tris-2-ethylhexoate (100/60) | Benzyl alcohol (50) | 35000 | 76 |

B. Application Examples

EXAMPLES 46–89:

Resin and curing agent are mixed by hand in a beaker in the amounts indicated in Table 3. The viscosity of the freshly prepared mixtures is then determined. In all the Examples the resin is 100 g of a mixture of 73% by weight of bisphenol A diglycidyl ether (viscosity at 25° C. 10,000–12,000 mPa.s, 5.25–5.4 epoxy equivalents/kg) and 27% by weight of o-cresyl glycidyl ether (reactive diluent).

790 in N/mm$^2$ modulus of elasticity in accordance with ISO 3268 in N/mm$^2$.

Also tested is the shelf-life of the impregnated felts (3 mm thick) at 20° C., namely in terms of the increasing stiffness of the felt, i.e. until the latter is no longer kneadable by hand.

The experimental arrangement described above meets to a very high degree of approximation the practical conditions of lining inner surfaces of pipes by the Insituform method.

The results of the experiments have been collated in Table 3, below.

TABLE 3

| Example No. | Resin mixture of 100 g of resin/x g of curing agent No. | Viscosity resin/curing agent mixture 25° C./mPa.s | Shelf-life 20° C./(days) | Tensile strength by ISO 3268 N/mm$^2$ | Flexural strength by ASTM D 790 N/mm$^2$ | Modulus of elasticity by ISO 3268 N/mm$^2$ |
|---|---|---|---|---|---|---|
| 46 | 10 g curing agent No. 1 | 700 | 6 | 39 | 63 | 3530 |
| 47 | 15 g curing agent No. 2 | 600 | 5 | 37 | 62 | 3500 |
| 48 | 23 g curing agent No. 3 | 670 | 8 | 38 | 66 | 3100 |
| 49 | 10 g curing agent No. 4 | 620 | 6 | 43 | 66 | 3600 |

TABLE 3-continued

| Example No. | Resin mixture of 100 g of resin/x g of curing agent No. | Viscosity resin/curing agent mixture 25° C./mPa.s | Shelf-life 20° C./(days) | Tensile strength by ISO 3268 N/mm$^2$ | Flexural strength by ASTM D 790 N/mm$^2$ | Modulus of elasticity by ISO 3268 N/mm$^2$ |
|---|---|---|---|---|---|---|
| 50 | 10 g curing agent No. 5 | 670 | 3 | 49 | 68 | 3900 |
| 51 | 10 g curing agent No. 6 | 650 | 2 | 40 | 59 | 3400 |
| 52 | 10 g curing agent No. 7 | 550 | 6 | 43 | 67 | 3800 |
| 53 | 10 g curing agent No. 9 | 540 | 3 | 44 | 67 | 3700 |
| 54 | 10 g curing agent No. 10 | 610 | 1 | 46 | 61 | 3700 |
| 55 | 12 g curing agent No. 11 | 600 | 6 | 41 | 71 | 3400 |
| 56 | 12 g curing agent No. 12 | 600 | 7 | 40 | 73 | 3400 |
| 57 | 12 g curing agent No. 13 | 550 | 5 | 38 | 61 | 3600 |
| 58 | 10 g curing agent No. 14 | 560 | 4 | 41 | 65 | 3500 |
| 59 | 10 g curing agent No. 15 | 560 | 6 | 38 | 54 | 3200 |
| 60 | 7 g curing agent No. 16 | 500 | 5 | 44 | 72 | 3500 |
| 61 | 10 g curing agent No. 17 | 700 | 6 | 49 | 72 | 3800 |
| 62 | 10 g curing agent No. 18 | 460 | 4 | 40 | 62 | 3300 |
| 63 | 20 g curing agent No. 19 | 500 | 5 | 41 | 73 | 3400 |
| 64 | 12 g curing agent No. 21 | 620 | 3 | 37 | 61 | 3300 |
| 65 | 15 g curing agent No. 21 | 430 | 4 | 42 | 63 | 3600 |
| 66 | 10 g curing agent No. 22 | 550 | 5 | 39 | 63 | 3500 |
| 67 | 10 g curing agent No. 23 | 640 | 4 | 39 | 71 | 3500 |
| 68 | 10 g curing agent No. 24 | 540 | 4 | 37 | 62 | 3500 |
| 69 | 15 g curing agent No. 25 | 670 | 5 | 38 | 63 | 3600 |
| 70 | 15 g curing agent No. 26 | 610 | 4 | 39 | 62 | 3700 |
| 71 | 12 g curing agent No. 27 | 470 | 5 | 32 | 50 | 3600 |
| 72 | 20 g curing agent No. 28 | 600 | 7 | 38 | 66 | 3380 |
| 73 | 25 g curing agent No. 29 | 450 | 7 | 37 | 63 | 2850 |
| 74 | 25 g curing agent No. 39 | 550 | 13 | 37 | 65 | 3100 |
| 75 | 25 g curing agent No. 40 | 700 | 8 | 37 | 66 | 3330 |
| 76 | 25 g curing agent No. 41 | 550 | —[1] | 39 | 68 | 3000 |
| 77 | 35 g curing agent No. 42 | 570 | —[1] | 34 | 63 | 2650 |
| 78 | 15 g curing agent No. 43 | 600 | 8 | 37 | 65 | 3240 |
| 79 | 31 g curing agent No. 44 | 650 | —[1] | 35 | 67 | 2900 |
| 80 | 21 g curing agent No. 45 | 710 | 8 | 35 | 65 | 3000 |
| 81 | 20 g curing agent No. 28 | 600 | 3 | 35 | 51 | 3600 |
| 82 | 20 g curing agent No. 29 | 800 | 5 | 38 | 58 | 3350 |
| 83 | 20 g curing agent No. 30 | 400 | 2 | 32 | 50 | 2800 |
| 84 | 7.5 g curing agent No. 31 | 1000 | 6 | 41 | 58 | 3500 |
| 85 | 12 g curing agent No. 32 | 600 | 3 | 29 | 53 | 2900 |
| 86 | 10 g curing agent No. 33 | 600 | 6 | 31 | 47 | 2700 |
| 87 | 10 g curing agent No. 34 | 600 | 2 | 35 | 54 | 3300 |
| 88 | 20 g curing agent No. 35 | 400 | 3 | 34 | 63 | 2800 |
| 89 | 10 g curing agent No. 36 | 600 | 5 | 30 | 56 | 3250 |

[1]not determined.

EXAMPLE 90-100

The method described in Examples 46-89 is used to test further resin/curing agent mixtures in which the following resins are used:

Resin I: Mixture of 70% by weight of bisphenol A diglycidyl ether having 5.25-5.4 epoxy equivalents/kg and 30% by weight of bisphenol F diglycidyl ether having 5.7 epoxy equivalents/kg.

Resin II: Bisphenol A diglycidyl ether having 5.25-5.4 epoxy equivalents/kg.

Resin III: Mixture of 50% by weight of bisphenol A diglycidyl ether having 5.25-5.4 epoxy equivalents/kg and 50% by weight of distilled bisphenol F diglycidyl ether having 6.1 epoxy equivalents/kg.

Resin IV: Mixture of 94% by weight of bisphenol A diglycidyl ether having 5.25-5.4 epoxy equivalents/kg and 6% by weight of o-cresyl glycidyl ether.

Resin V: Bisphenol F diglycidyl ether having 5.7 epoxy equivalents/kg.

Resin VI: Distilled bisphenol F diglycidyl ether having 6.1 epoxy equivalents/kg.

Resin VII: Mixture of 90% by weight of Resin I and 10% by weight of a mixture of n-dodecyl and n-tetradecyl glycidyl ethers having 3.4 epoxy equivalents/kg.

Resin VIII: Mixture of 90% by weight of bisphenol A diglycidyl ether having 5.25-5.4 epoxy equivalents/kg and 10% by weight of a mixture of n-dodecyl and n-tetradecyl glycidyl ethers having 3.4 epoxy equivalents/kg.

Resin IX: Mixture of 78% by weight of bisphenol A diglycidyl ether having 5.25-5.4 epoxy equivalents/kg and 22% by weight of neopentylglycol diglycidyl ether having 7.2 epoxy equivalents/kg.

The results have been collated in Table 4, below.

TABLE 4

| Example No. | Resin mixture of 100 g of resin/x g of curing agent No. | Viscosity of resin/curing agent mixture 25° C./mPa.s | Shelf-life 20° C.(days) | Tensile strength by ISO 3268 N/mm$^2$ | Flexural strength by ASTM D 790 N/mm$^2$ | Modulus of elasticity by ISO 3268 N/mm$^2$ |
|---|---|---|---|---|---|---|
| 90 | 100 g Resin I/10 g curing agent No. 15 | 6500 | 3 | 46 | 82 | 3500 |
| 91 | 100 g Resin II/10 g curing agent No. 15 | 6800 | 3 | 45 | 64 | 3700 |
| 92 | 100 g Resin III/10 g curing agent No. 15 | 3300 | 3 | 38 | 61 | 3500 |

TABLE 4-continued

| Example No. | Resin mixture of 100 g of resin/x g of curing No. | Viscosity of resin/curing agent mixture 25° C./mPa.s | Shelf-life 20° C.(days) | Tensile strength by ISO 3268 N/mm² | Flexural strength by ASTM D 790 N/mm² | Modulus of elasticity by ISO 3268 N/mm² |
| --- | --- | --- | --- | --- | --- | --- |
| 93 | 100 g Resin IV/10 g curing agent No. 15 | 4000 | 3 | 38 | 67 | 3750 |
| 94 | 100 g Resin V/10 g curing agent No. 15 | 4300 | 3 | 45 | 72 | 3500 |
| 95 | 100 g Resin VI/10 g curing agent No. 15 | 1500 | 5 | 37 | 58 | 3400 |
| 96 | 100 g Resin VII/10 g curing agent No. 15 | 1600 | 5 | 40 | 60 | 3000 |
| 97 | 100 g Resin I/10 g curing agent No. 14 | 6000 | 1 | 50 | 66 | 3770 |
| 98 | 100 g Resin IV/10 g curing agent No. 14 | 4600 | 1 | 44 | 69 | 3700 |
| 99 | 100 g Resin VIII/10 g curing agent No. 14 | 2300 | 2 | 44 | 70 | 3500 |
| 100 | 100 g Resin IX/10 g curing agent No. 14 | 1100 | 2 | 45 | 76 | 3500 |

What is claimed is:

1. A salt of resorcinol or bisphenol A and 2-n-propylimidazole.

2. A salt as claimed in claim 1, of resorcinol and 2-n-propylimidazole.

* * * * *